April 13, 1943.  E. E. HANS  2,316,421
COMBINATION HEATING AND VENTILATING SYSTEM
Filed July 9, 1942   4 Sheets-Sheet 1

INVENTOR
BY Edmund E. Hans.
Edwin C. McRae
ATTORNEY

April 13, 1943.   E. E. HANS   2,316,421
COMBINATION HEATING AND VENTILATING SYSTEM
Filed July 9, 1942   4 Sheets-Sheet 3

INVENTOR
BY Edmund E. Hans.
Edwin C. McRae
ATTORNEY

April 13, 1943.   E. E. HANS   2,316,421
COMBINATION HEATING AND VENTILATING SYSTEM
Filed July 9, 1942   4 Sheets-Sheet 4

INVENTOR
BY Edmund E. Hans.
Edwin C. McRae
ATTORNEY

Patented Apr. 13, 1943

2,316,421

UNITED STATES PATENT OFFICE 2,316,421

COMBINATION HEATING AND VENTILATING SYSTEM

Edmund E. Hans, Detroit, Mich.

Application July 9, 1942, Serial No. 450,317

4 Claims. (Cl. 98—2)

The object of this invention is to provide a combination heating and ventilating system for automobiles which will function to condition the interior of closed cars in both summer and winter.

A further object of my invention is to provide means for filtering, ventilating and heating the interior of a motor vehicle, so that in winter or summer the air in the interior of the car will at all times be fresh. By means of my present invention, in cold weather the air is not only filtered and cleaned, but warmed to living room temperature and distributed evenly throughout the entire interior of the vehicle body. Dirt, dust, snow, insects, etc. are, of course, excluded. With my improved system the windows will not frost or fog and the entire device may be compactly installed either at the factory or be later quickly installed in any modern automobile.

A further object of my invention is to provide a ventilating system, as above described, wherein fresh filtered air is drawn into the car and mixed with a proportion of the air already within the car, this mixture then being heated and recirculated uniformly throughout the car body. Fresh air of uniform temperature is thereby maintained in the car. A large volume of air is circulated by my device in contrast to the ordinary heater which highly heats a small amount of air and blows this dried out hot air upon the nearest passenger.

A further object of my invention is to provide a windshield defrosting mechanism whereby either heated air or air at body temperature may be directed upon the windshield. When ice has already formed on the windshield, it is necessary to use comparatively hot air to rapidly remove same, but after the ice has melted, air at body temperature is sufficient to prevent further ice formation.

Still a further object of my invention is to provide a ventilating system for summer use whereby air may be exhausted from the car and filtered air drawn in.

An important feature of this invention is that all of the aforementioned functions are accomplished by means of a conventional fan type blower unit operating in only one direction. Heretofore, when automobile heaters have been arranged to function in the aforementioned manner, it has been necessary to provide a reversing fan motor and very elaborate duct work. My improved construction is believed to be a decided improvement over any heater or ventilating system so far designed because of its simplicity of operation, ease of control, and relatively inexpensive construction.

Still a further object of my invention is to provide a new heating radiator core which is constructed to give free, high velocity air flow through a series of long, unobstructed copper fins without restriction and heat subzero incoming air 100° in one pass through core, maintaining heat in front and rear compartments of motor vehicle above 70° temperature. My improved core is free from cold spots at all times, and, being provided with high velocity narrow flow channels through which heated liquid or vapor may pass, produces highest efficiency of heat output.

Still a further object of my invention is to provide means for the manual selected control of the heated liquid, so that the liquid may be generated into vapor. This control means meets any heating demand necessary where outside zero air is forced through the cowl ventilator into the fan chamber at high velocity to maintain the incoming air at above 70° Fahrenheit in the lower front and rear compartments of the motor vehicle.

Still a further object of my invention is to provide means for dividing the incoming cold air after it passes through the fan so that a portion of the cold air passes unheated through an air nozzle at high velocity over heads of the passengers in the front compartment, thereby decreasing the temperature at breathing level below the floor temperature. This results in an improved heating and ventilating system, because it provides a healthy and safe atmosphere for the driver and occupants of the car while heating the lower portion to a higher temperature.

A further object is to provide for a divided stream of air which is circulated at high velocity into the front and rear compartments, taking a portion of cold air from the outside and mixing it with a portion of the inside air and recirculating the mixture. Means is provided for proportioning and heating the air by shutting off the cold air when car compartment is cold. The inside air may be thus first heated to a predetermined temperature in a comparatively short time, after which time any portion of cold air may be added.

Tests of the condition of zero air after it has been heated above 70° shows the air to be very unhealthy, resulting in irritation of certain organs of the body. For this reason I direct the colder air over the heads of those in the front seat and along both sides of the upper part of compartment to maintain a higher temperature on the lower part of both front and rear compartment.

With these and other objects in view, my invention consists in the arrangement, construction and combination of the various parts of my improved device, as described in the specification, claimed in my claims, and illustrated in the accompanying drawings, in which:

Figure 9 is a sectional view, taken upon the line 9—9 of Figure 1.

Figures 5, 6:
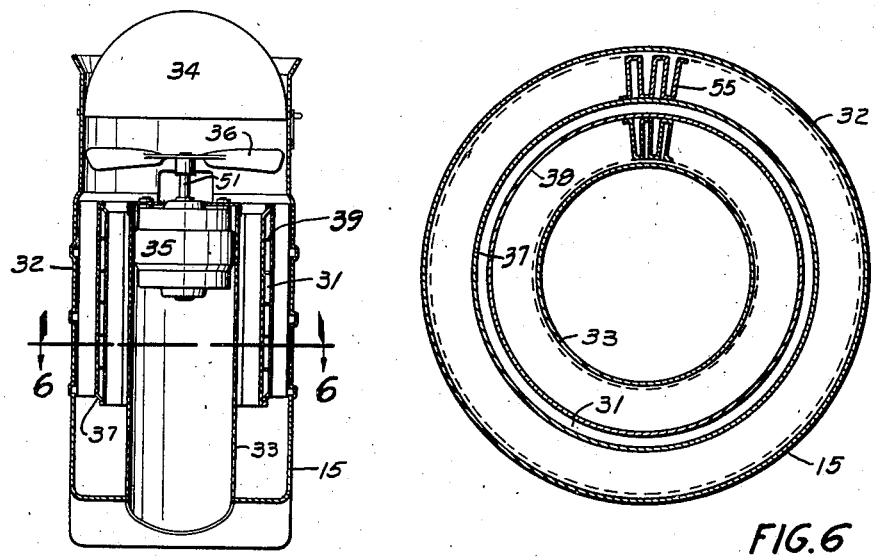
Figure 5 is a sectional view taken upon the line 5—5 of Figure 2.
Figure 6 is a sectional view, taken upon the line 6—6 of Figure 5, the section being enlarged somewhat over that shown in Figure 5 to better illustrate the radiator fin construction.
Figure 1:
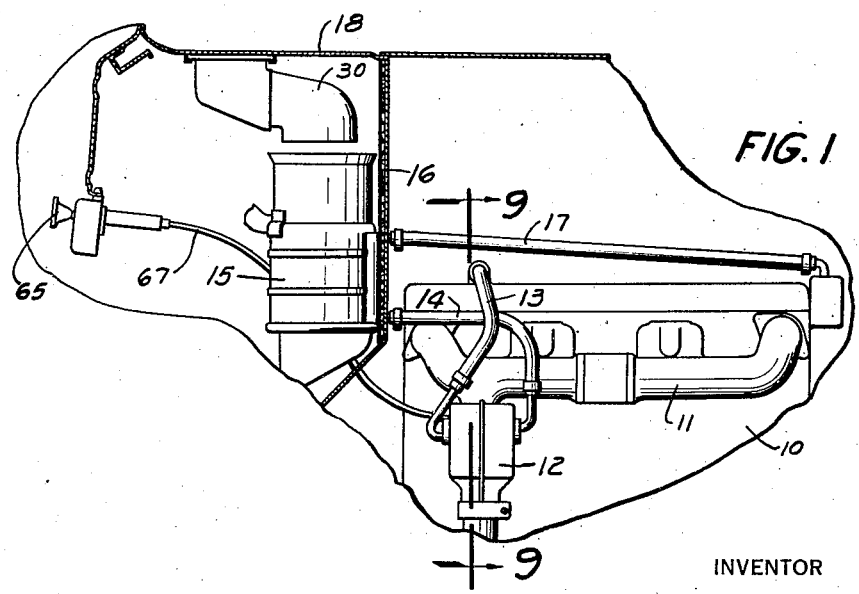
Figure 1 is a vertical central sectional view taken through the engine compartment of a motor vehicle having my improved heating and ventilating system installed therein.

Referring to the accompanying drawings, I have used the reference numeral 10 to indicate a conventional motor vehicle engine, which engine is provided with an exhaust manifold 11. A generator unit 12 is secured to manifold 11 and the conventional exhaust pipe of the vehicle extends from the generator 12 to the rear of the car.

A water inlet pipe 13 extends from the top of the engine cylinder block to the inlet side of the generator 12, while an outlet conduit 14 extends from the generator 12 to a radiator 15 associated with my improved heating and ventilating system. This radiator 15 is secured to the passenger compartment side of a dash 16, while the engine 10 and generator are, of course, located on the forward side of the dash. A return hose 17 extends from the radiator 15 back to the cooling system of the motor. The water pump normally associated with the engine 10 circulates fluid through the generator and then through the radiator.

The generator 12 is provided with a vane-type valve 69 therein, which in its closed position deflects the exhaust gases from the exhaust manifold into a heating chamber 60 in which is located a heat exchanger 61. Plurality of fins 62 are secured to the heat exchanger 61 and are arranged so that the exhaust gases must follow the direction shown by arrows 63 in order to enter the exhaust pipe after passing over the fins 62. When the valve 69 is in the position shown by dotted lines 64, the gases flow directly from the manifold 11 to the exhaust pipe. A manually operated button 65 is mounted upon the vehicle instrument board 66 and is connected to the valve 59 by means of a flexible control cable 67 so that the valve may be conveniently opened or closed by the driver of the car.

The purpose of the generator 12 is to take water which has been heated to the normal operating temperature of the motor, and to heat same by means of the heat exchanger 61 until it is almost at boiling point, before it is conducted into the radiator 15. The novel features of my generator are, however, being covered in another application.

Figure 2:
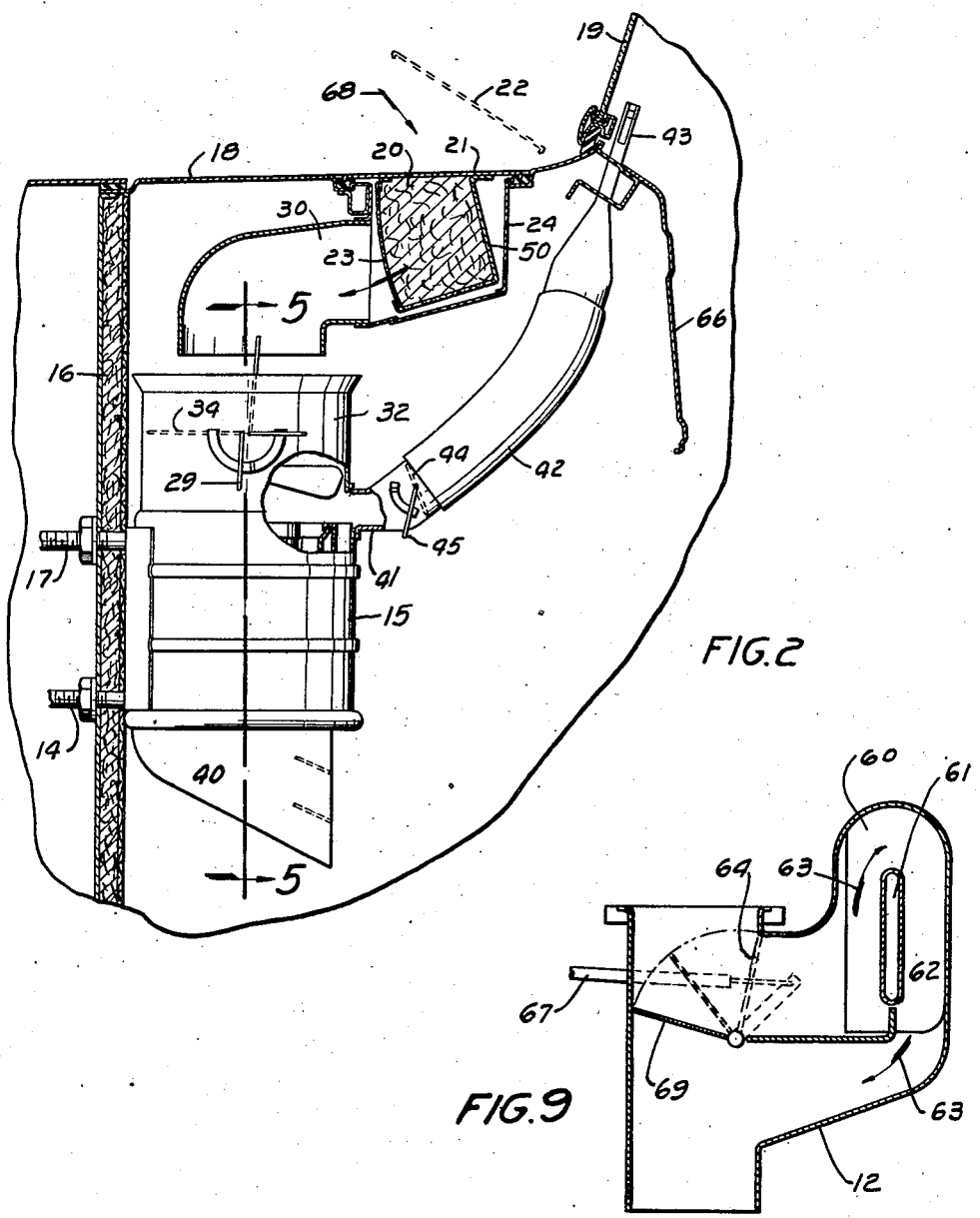
Figure 2 is an enlarged view of the heating and ventilating unit, shown in Figure 1, parts being broken away to better illustrate the construction.
Figure 3:
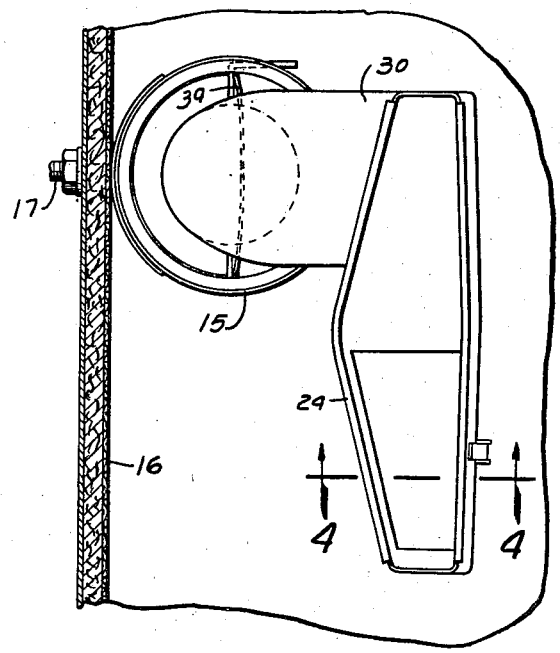
Figure 3 is a plan view of the ventilating system shown in Figure 2, the cowl of the vehicle being removed.
Figure 4:
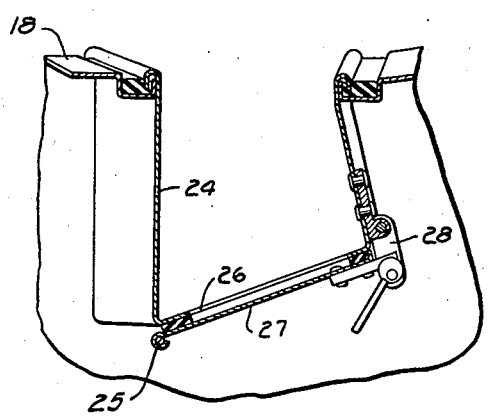
Figure 4 is a sectional view, taken upon the line 4—4 of Figure 3.

Referring to Figure 2, I have used the reference numeral 18 to indicate the cowl of the vehicle, and a windshield 19 extends upwardly from the cowl. A cowl ventilator opening is provided in the cowl just ahead of the windshield 19 and a cowl ventilator door 21 is hinged to the underside of the cowl so as to swing upwardly therefrom to the position shown by dotted lines 22. An air filter unit 20 is secured to the underside of the door 21, which filter is held in position by a box-shaped structure comprising a solid back plate 50 having forward and bottom faces 23 formed of wire mesh. The material 20 is preferably of the cellular structure which is commonly associated with filters and is usually saturated with oil to make the dirt and foreign particles in the incoming air adhere thereto.

When the door 21 is closed, air cannot enter the filter, but when the door is in the position shown by lines 22, then the air follows the path shown by arrows 68, through the forward face of the filter unit and out through the bottom of the unit.

A rectangular shaped filter housing 24 is secured to the under side of the cowl 18, this housing being of substantially the same shape as the cowl ventilator opening. An opening 26 is provided in the bottom of the housing 24 over which a door 27 is hingedly secured at 25. A hasp 28 is hinged to the front side of the housing 24 in position to operatively hold the door 27 closed over the opening 26, or to allow the door to remain open, as desired. An elbow-shaped duct 30 extends from one end of the housing 24 forwardly and downwardly to position directly above the radiator 15 so when the door 27 is closed air entering through the cowl ventilator will be directed into the heating radiator.

In the operation of the device, as so far described, the cowl door 21 may be raised and the forward motion of the door will direct air through the filter unit 20 downwardly into the housing 24, from which it will be discharged either through the opening 26, if the door 27 is open, or otherwise through the duct 30 to the radiator 15.

The radiator unit 15 is shown in detail in Figures 2, 5 and 7, and comprises a cylindrical sheet metal shell 32 which is spaced several inches below the bottom of the duct 30. A tubular sleeve 33 is secured in axial alignment within the shell 32, and a pair of butterfly valves 34 are pivotally mounted in the upper end of the shell 32. These valves are manually operated by control handles 29. A motor 35 is fixed in the upper end of the sleeve 33, the motor having a shaft 51 projecting upwardly therefrom, on which a propeller type fan 36 is secured, the fan having a diameter just slightly smaller than the diameter of the shell 32. The fan is positioned directly beneath the valve 34 and is arranged to normally draw air in through the upper end of the sleeve 33 and force it downwardly through the annular chamber between the sleeve 33 and the shell 32.

From Figures 5 and 6, it will be noted that a pair of concentric tube members 37 and 38 are positioned between the sleeve 33 and shell 32. These tubes have their ends sealed together to form an annular chamber 31 which extends from the upper portion of the motor 35 downwardly to position near the bottom of the shell 32. A series of baffles 39 are inserted in the chamber 31 so that the hot water and vapor entering through the inlet 14 must follow a tortuous path in flowing upwardly through the chamber 31 to reach the outlet hose 17. The baffles 39 insure a relatively high velocity of fluid within the system. A helical shaped baffle may, however, be provided if desired.

A continuous strip of fin material 55 is corrugated and bent into a ring and is then interposed between the outer tube 37 and the shell 32. Another length of the fin material is likewise corrugated and interposed between the tube 38 and the inner sleeve 33. The fins 55 are then hydrogen welded to the tubes 37 and 38, respectively. The heat contained in the fluid within the annular chamber 31 is thus conducted to the fins 55 in an efficient manner. Air is forced by the fan 36 lengthwise along the fins 55 to thereby absorb the heat therefrom. In the construction shown in Figure 2, a fixed deflector 40 is secured to the bottom of the shell 32 and directs the air rearwardly at high velocity so that it strikes the floor slightly forward of the front seat. Inasmuch as the air from the deflector 40 is blowing rearwardly as well as downwardly, a portion thereof blows under the front seat to the rear of the car. However, sufficient air is stopped by the seat to maintain an even temperature in both front and rear seat compartments.

From the foregoing it will be seen that when hot water is being circulated through the radiator and the fan 36 is rotating and the valves 34 are open, air will be drawn into the top of the shell and forced downwardly around the fins 55 and then directed rearwardly and downwardly by the deflector 40. When the ventilator 21 is open, a portion of the air drawn by the fan 36 will enter from the duct 30 to thereby form a mixture of fresh air from outside the car and returned air from inside the car. This proportion can be conveniently regulated by the amount that the ventilator is opened. It should be kept in mind that at car speeds around sixty miles per hour the pressure in the conduit 30 must be regulated by the valve 22 so that most of the air coming through the conduit 30 will pass through the heating core without spilling over. This can be easily accomplished for country driving. No spillover is possible with the door valve 22 wide open in normal driving. The elbow 30 is of correct size to provide the proper amount of incoming air at thirty miles per hour without spilling over.

I have provided a novel defrosting unit for use in this system, which unit comprises a flange 41 which is fastened to one side of the shell 32 in position between the fan 36 and the top of the radiator chamber 31. A flexible tube 42 extends from the flange 41 upwardly to a nozzle 43 which is secured to the instrument board 66 adjacent to the windshield 19. The nozzle 43 is shaped to project a fan-shaped stream of air over the windshield and a butterfly valve 44 is fixed in the flange 41 and controlled by an arm 45 to open and shut the defroster.

When ice has formed on the windshield it is desirable to blow hot air against the glass to quickly remove the ice. To do this, the operator need only turn on the fan, open the valve 44 and close the valves 34. When this is done, air will be thrown off centrifugally by the fan 36 into the flange 41. The supply of air for this purpose is at such time drawn upwardly through the fins 55, thereby supplying highly heated air to the nozzle 43. The above described function is possible even though the blades of the fan are arranged to normally force air downwardly through the radiator. The helix angle of the fan blade is only effective in directing air axially when the air is permitted to enter the intake side of the fan. If the intake air is shut off, then the discharge is stopped and the fan acts only to force air centrifugally. If both intake and outlet openings are closed then no air is circulated, but in the above case the normal outlet of the fan is still open so that air can be drawn therethrough by the centrifugal force created. Normally, there is no conflict between the air thrown axially and that thrown radially by the conventional propeller type fan, as an ample inlet opening is provided for both. However, in this case the air, when forced centrifugally must overcome the axial pressure due to the helix angle of the blades. The centrifugal pressure is higher because it is almost in proportion to the peripheral speed of the outer ends of the fan blades, whereas the axial pressure is less because it is only proportional to the mean diameter of the fan.

The action of this fan when the valves 34 are closed is quite similar to that which takes place in a conventional vacuum cleaner. The conduit 41 is similar to the cleaner discharge pipe, the fan 36 acts as an impeller and the radiator functions as the air inlet. When one side of the impeller is closed, it makes little if any difference as to what angle the blades are set, as in any case they throw the air radially.

The defroster offers considerable restriction to the volume of air delivered by the fan so that the reduced volume delivered at the defroster is quite highly heated. After the ice has been melted it is usually desirable to blow air at car temperature against the windshield, and this can be done simply by opening the valves 34. This permits air to enter the upper end of the shell 32. The point of greatest restriction in the shell 32 is at the fins 55 so that a portion of the air drawn in at this time by the fan 36 will be forced laterally into the defroster flange, while the remaining portion will be forced downwardly around the radiator fins.

The important feature of this construction is that the reversal of air through the radiator is obtained without reversing the fan. This not only simplifies the motor construction but also permits the device to be operated so that a portion of the heat is used to operate the defroster while the remainder is used to heat the passenger compartment. This function is believed impossible with other heaters with which the applicant is familiar.

Figures 7, 8:
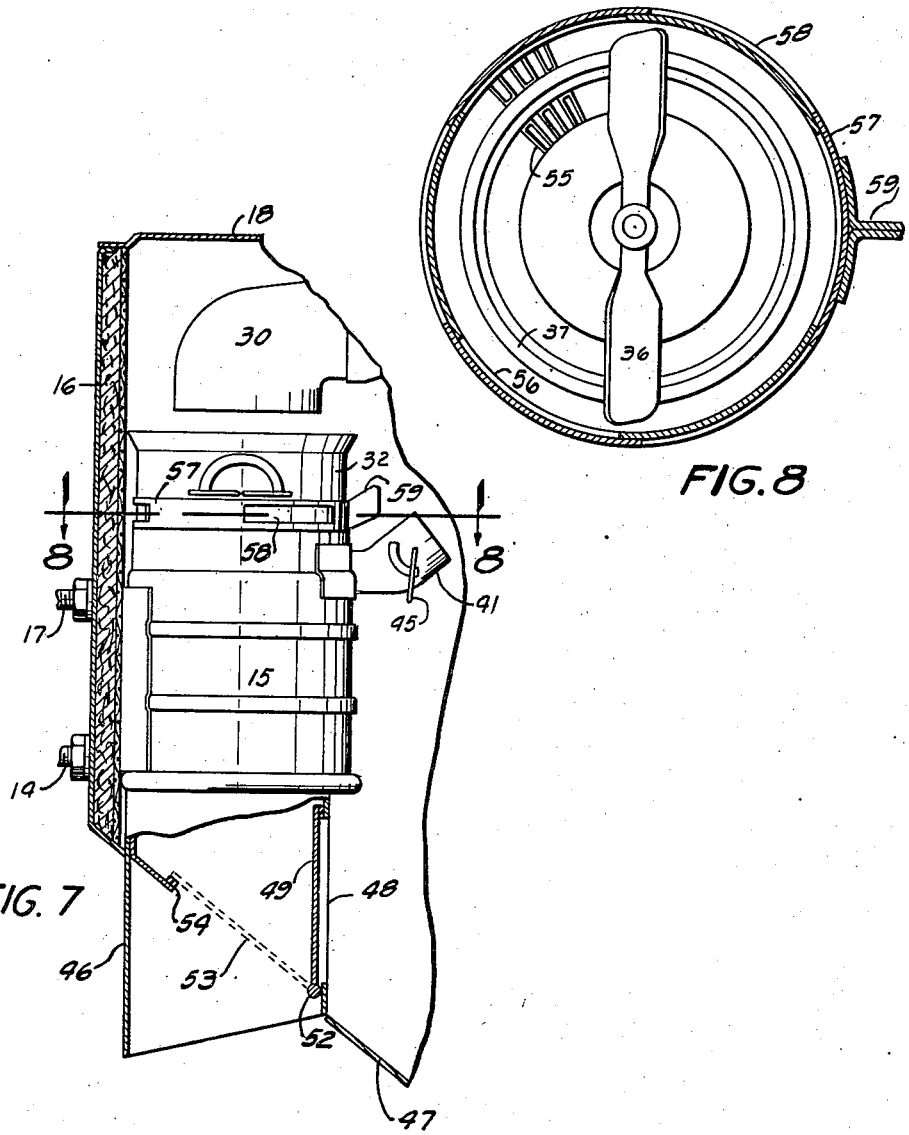
Figure 7 shows an alternate construction in which means are provided for exhausting the air from the car.
Figure 8 is a sectional view, taken upon the lines 8—8 of Figure 7.

Referring to Figures 7 and 8 of the drawings, I have shown an alternate radiator construction which may be used in place of the radiator shown in Figure 2, whereby the car may be ventilated efficiently in the summer time.

In this construction, the radiator unit is quite similar to that previously described, but the deflector 40 has been replaced by a tube 46 which extends from the bottom of the shell 32 downwardly through the floorboards 47 of the car. The tube 46 is preferably square and its rear wall is provided with an opening 48 therein. A valve 49 is pivotedly mounted at 52 so as to swing from the position shown by dotted lines 53 to the open position where the valve closes the opening 48. A seat 54 is provided within the tube which, when the valve is in the position shown at 53, closes the bottom end of the tube to thereby deflect the air out through the opening 48.

From the foregoing it will be seen that when the valve is in the position shown by solid lines, air will be drawn in through the upper end of the shell 32 and be discharged straight downwardly beneath the floorboards 47 of the car, thereby exhausting the air from the car for summer driving. The valve 49 is usually operated only in changing the operation from a heating to a cooling and ventilating system. When the valve 49 is in the position shown by dotted lines 53, the unit functions the same as the unit shown in Figure 2, the valve deflecting the air downwardly and rearwardly along the inside of the car.

I have also shown in Figures 7 and 8 an auxiliary temperature control which may be used when more accurate regulation of the temperature in the car is desired. In this construction, I have provided three slots 56 in the shell just above the fan 36 but beneath the valves 34. A band 57 is secured around the outside of the shell 32, which band is provided with three slots 58 therein which in one position of the band are aligned with the slots 56 in the shell 32. Thus, upon rotation of the fan, air will be drawn through these slots from the car body proper. An arm 59 is secured to one side of the band 57 so that the band may be rotated to adjustably regulate the effective length of the aligned slots and thus regulate the amount of air drawn therethrough.

In order to ventilate the car in summer the valves 34 are closed and the band 57 rotated to open the slots 56. The air entering the conduit 30 thus flows over the top of the unit and the stale or hot air in the front compartment will be drawn in through the slots 56 and forced downwardly through the duct 46.

*Instructions for operating*

When the car is cold in zero weather, start the motor, close vent door 22 and open generator valve 64 to position at 69 by pulling out button 65. Very shortly heat vapors will enter heater 15 and the air at high velocity passing through heater will recirculate air in the front and rear compartment evenly. In a little over one minute all the air in the body will have passed through the heater. After the air has been recirculated several times, the car will be comfortable enough so that vent in door 22 may be opened, allowing fresh air to enter into the heating core, and at the same time cold air may pass directly into compartment through the nozzle 43 by passing the cold air overhead. If floor air should become too hot, button 65 may be pushed toward the dash, adjusting the same until the heat is comfortable. When the valve 69 is seated, as shown at 64, exhaust gases enter muffler in the regular manner. At this time the heated liquid in the engine is circulated through the heater to provide the heat. The electric fan is in full running position at all times to assure the uniform temperature. The heat generator shown provides sufficient heat in sub-zero weather under all the aforesaid conditions.

With cold air passing overhead and along the side windows a temperature change of from 7 to 15 degrees from that of the lower air current is maintained. This condition provides a new comfort in car operation.

Among the many advantages arising from the use of my improved construction, it may be well to mention that during the normal operation of this heating and ventilating system the air which is heated and circulated throughout the car comprises a mixture of air already in the car plus fresh air from the outside. In this way, a relatively high velocity of air through the heater can be maintained and thus secure uniform air temperature throughout the car without requiring an excessively large radiator.

A further advantage results in that the defroster unit of my system can normally be controlled by operation of the single valve 44, but if the occasion arises that hot air is necessary to melt ice or the like from the windshield, then upon closing of the valve 34 the full heat output of the radiator is available for quickly melting the ice or sleet upon the windshield. However, it has been found by practical tests that with valves 34 open and the heater operating to its capacity and with cowl door 21 closed sufficient temperature is created from the recirculated air to melt ice on the windshield. This is greatly assisted by the static pressure created between the bottom of the fan 36 and the top of the core 37.

For summer driving, the cowl ventilator 22 is opened so that air flows through the conduit 30 but the valves 34 being closed, the air is spilled over into the front compartment. The stale air is exhausted through the slots 56.

Some changes may be made in the arrangement, construction and combination of the various parts of my improved device without departing from the spirit of my invention, and it is my intention to cover by my claims such changes as may reasonably be included within the scope thereof.

I claim as my invention:

1. An automobile heating and ventilating arrangement comprising a vehicle body including a wall having an opening therethrough through which outside air is adapted to flow, a closure for said opening, a duct within the body through which air flowing through the opening passes, a sleeve having one extremity adjacent, in axial alignment with, and longitudinally spaced from the end of the duct remote from said opening, the perimeter of the sleeve being greater than that of the duct at the adjacent extremities, a fan and a heater within the sleeve whereby air flowing through the opening induces a flow of air from within the body into the sleeve so that both outside air and recirculated air from within the body are discharged through the heater, and when the closure is shut air is recirculated from within the body through the sleeve and heater by the fan.

2. The combination set forth in claim 1, including means in the sleeve for preventing passage of air from the duct into said sleeve, said means being adapted to divert said air directly into the vehicle body.

3. An automobile heating and ventilating arrangement comprising an automobile body including a cowl having an opening therethrough, an adjustable closure for said opening, a downwardly disposed duct mounted beneath the cowl so that air passing through the opening flows through the duct, a substantially vertical sleeve the upper extremity of which is adjacent, and spaced from and below the lower end of the duct and in alignment with the latter, the perimeter of the lower end of the duct being smaller than that of the adjacent end of the sleeve, a fan mounted in the sleeve beneath the duct, and a heater mounted in the sleeve beneath the fan, whereby, when the closure is sufficiently open outside air flowing through the duct into the sleeve induces a flow of air from within the vehicle into the sleeve so that both inside and outside air are discharged by the fan through the heater, and when the closure is almost or completely shut air from within the vehicle is drawn by the fan into the sleeve and discharged through the heater.

4. An automobile heating and ventilating arrangement comprising a portion of a vehicle body including a wall having an opening therethrough, a duct within the body in registry with said opening, a sleeve within the vehicle adjacent and in alignment with and spaced longitudinally from the end of the duct remote from said opening through which air from the latter is adapted to flow, a fan and a heater in the sleeve, valve means in the sleeve for preventing the passage of outside air from the duct thereinto whereby said air is diverted into the vehicle between the duct and the sleeve, said sleeve having an opening therein on the suction side of the fan, means for closing the opening, an outlet connection extending from the sleeve on the discharge side of the fan and terminating outside the vehicle body, and means for selectively directing the flow from the fan through said outlet connection or through said sleeve.

EDMUND E. HANS.